United States Patent
Hosoi et al.

(10) Patent No.: US 11,393,069 B2
(45) Date of Patent: Jul. 19, 2022

(54) IMAGE PROCESSING APPARATUS, IMAGE PROCESSING METHOD, AND COMPUTER READABLE RECORDING MEDIUM

(71) Applicant: NEC Corporation, Tokyo (JP)

(72) Inventors: Toshinori Hosoi, Tokyo (JP); Long Hin Chong, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/041,804

(22) PCT Filed: Mar. 28, 2018

(86) PCT No.: PCT/JP2018/012989
§ 371 (c)(1),
(2) Date: Sep. 25, 2020

(87) PCT Pub. No.: WO2019/186833
PCT Pub. Date: Oct. 3, 2019

(65) Prior Publication Data
US 2021/0027421 A1   Jan. 28, 2021

(51) Int. Cl.
*G06T 3/40* (2006.01)
*G06T 7/70* (2017.01)

(52) U.S. Cl.
CPC .......... *G06T 3/4007* (2013.01); *G06T 7/70* (2017.01); *G06T 2207/30196* (2013.01)

(58) Field of Classification Search
None
See application file for complete search history.

(56) References Cited

U.S. PATENT DOCUMENTS

| 10,372,228 B2* | 8/2019 | Mao ................ G06F 3/017 |
| 10,830,584 B2* | 11/2020 | Boulkenafed ...... G06K 9/00342 |
| 2018/0268589 A1* | 9/2018 | Grant ................ G06F 3/017 |

FOREIGN PATENT DOCUMENTS

| JP | 2006-146413 A | 6/2006 |
| JP | 2016-099781 A | 5/2016 |
| JP | 2017-058930 A | 3/2017 |

OTHER PUBLICATIONS

English translation of Written opinion for PCT Application No. PCT/JP2018/012989, dated May 15, 2018.
International Search Report for PCT Application No. PCT/JP2018/012989, dated May 15, 2018.
C. Guillemot, et al, "Image Inpainting Overview and Recent Advances", IEEE Journals and Magazine, Jan. 2014, pp. 127-144.

(Continued)

*Primary Examiner* — Delomia L Gilliard
(74) *Attorney, Agent, or Firm* — Sughrue Mion, PLLC

(57) ABSTRACT

An image processing apparatus 10 includes an image generation model construction unit 11 configured to construct an image generation model for, using image data in which a part of a person is lost as an input image, generating an image in which the lost part of the person has been interpolated. The image generation model construction unit 11 constructs the image generation model by machine learning in which a first sample image including an image of a person, a second sample image in which a part of the person in the first sample image is lost, and human body information specifying a posture of the person in the first sample image are used.

12 Claims, 10 Drawing Sheets

(56) References Cited

OTHER PUBLICATIONS

P. Isola, et al.,"Image-to-Image Translation with Conditional Adversarial Networks", 2017 IEEE Conference on Computer Vision and Pattern Recognition, pp. 5967-5976.
Matsuda, Yuya et al., The 31st Picture Coding Symposium of Japan the 21st Image Media Processing Symposium, Nov. 16, 2016, pp. 26,27.
Kawai, Norihiko, Image inpainting and its application to diminished reality, Systems, Control and Information, Oct. 15, 2014, vol. 58, No. 10, pp. 426-431, ISSN 0916-1600.

* cited by examiner

IMAGE PROCESSING APPARATUS, IMAGE PROCESSING METHOD, AND COMPUTER READABLE RECORDING MEDIUM

This application is a National Stage Entry of PCT/JP2018/012989 filed on Mar. 28, 2018, the contents of all of which are incorporated herein by reference, in their entirety.

TECHNICAL FIELD

The present invention relates to an image processing apparatus and an image processing method for interpolating a lost portion of an image, and furthermore relates to a computer readable recording medium that includes recorded thereon a program for realizing the image processing apparatus and the image processing method.

BACKGROUND ART

In recent years, with the improvement in camera and computer performance, a technique has been developed for detecting a specific person from a video captured using a camera and performing specification of the individual, an analysis of behavior, etc., on the detected person. Also, such a technique has been used in monitoring systems for the detection of strangers, for example.

Incidentally, if there are objects between a detection-target person and a camera, the detection-target person is masked by these objects, and a part or the entirety of the person will be lost in the video. Furthermore, masking objects also include transmissive objects such as fog and glass. In this case, while the person is not masked partially or entirely, a part or the entirety of the person becomes unclear in the video, and thus, a part or the entirety of the person is lost in this case as well.

Also, a part or the entirety of a detection-target person is lost not only in a case in which the person is masked by objects, but also in a case in which the detection-target person is exposed to strong light such as sunlight. In such a case as well, the portion of the person exposed to light is blown out and lost in the video. On the other hand, there are cases in which portions other than a detection-target person are bright, and exposure of a part of the person becomes excessively low. In this case, the portion at which exposure is excessively low is blacked out and lost in the video.

Furthermore, in a state in which a part of a person is lost, the accuracy of the specification of the individual, the analysis of behavior, etc., described above decreases significantly. Accordingly, techniques for interpolating a lost portion of an image are being proposed (for example, refer to Non-Patent Documents 1 and 2).

Specifically, Non-Patent Document 1 discloses a technique in which image interpolation is performed such that a texture of an unlost portion is inserted to a lost portion of an image and so that there is no discontinuity in the texture at a boundary region between the two portions. Also, in the technique disclosed in Non-Patent Document 1, the continuity of texture is expressed as an energy function, and suitable interpolation is realized by performing optimization so that this energy function is maximized.

In addition, Non-Patent Document 2 discloses a technique for interpolating a lost portion of an image using machine learning. In the technique disclosed in Non-Patent Document 2, a large number of pair images constituted of an input image in which a loss is present and a target image with no loss are prepared in advance, and machine learning is performed and a learning model is constructed so that a target image is output if an input image is applied to the learning model.

LIST OF RELATED ART DOCUMENTS

Non-Patent Document

Non-Patent Document 1: C. Guillemot, et al., "Image Inpainting: Overview and Recent Advances", IEEE Journals and Magazine, 2014

Non-Patent Document 2: P. Isola, et al., "Image-to-Image Translation with Conditional Adversarial Networks", 2017 IEEE Conference Vision and Pattern Recognition, 2017

SUMMARY OF INVENTION

Problems to be Solved by the Invention

However, in the above-described technique disclosed in Non-Patent Document 1, interpolation is merely performed so that local regions are continuous, and the larger the area of a lost portion becomes, the more difficult it becomes to accurately interpolate the lost portion.

In contrast, since learning of lost portions is performed in the above-described technique disclosed in Non-Patent Document 2, a lost portion can be interpolated even if the area of the lost portion is large. However, in the above-described technique disclosed in Non-Patent Document 2, machine learning is merely performed so that a target image is produced from an input image, and no consideration is given at all to the posture of an interpolation-target person. Accordingly, in the above-described technique disclosed in Non-Patent Document 2, the posture of a person after interpolation of a lost portion is performed may become unnatural. In this case, the accuracy of the analysis of the behavior of the person may significantly decrease.

One example object of the invention is to provide an image processing apparatus, an image processing method, and a computer readable recording medium that can overcome the above-described problems and construct a model for interpolating an image of a person a part of which is lost while taking the posture of the person into consideration.

Means for Solving the Problems

In order to achieve the above-described object, an image processing apparatus according to an example aspect of the invention includes:

an image generation model construction unit configured to construct an image generation model for, using image data in which a part of a person is lost as an input image, generating an image in which the lost part of the person has been interpolated, wherein the image generation model construction unit constructs the image generation model by machine learning in which a first sample image including an image of a person, a second sample image in which a part of the person in the first sample image is lost, and human body information specifying a posture of the person in the first sample image are used.

In addition, in order to achieve the above-described object, an image processing method according to an example aspect of the invention includes:

(a) a step of constructing an image generation model for, using image data in which a part of a person is lost as an input image, generating an image in which the lost part of the person has been interpolated, wherein in the (a) step, the image generation model is constructed by machine learning in which a first sample image including an image of a person, a second sample image in which a part of the person in the first sample image is lost, and human body information specifying a posture of the person in the first sample image are used.

Furthermore, in order to achieve the above-described object, a computer readable recording medium according to an example aspect of the invention includes a program recorded thereon, the program including instructions that cause a computer to carry out:

(a) a step of constructing an image generation model for, using image data in which a part of a person is lost as an input image, generating an image in which the lost part of the person has been interpolated, wherein in the (a) step, the image generation model is constructed by machine learning in which a first sample image including an image of a person, a second sample image in which a part of the person in the first sample image is lost, and human body information specifying a posture of the person in the first sample image are used.

Advantageous Effects of the Invention

As described above, according to the invention, a model for interpolating an image of a person a part of which is lost while taking the posture of the person into consideration can be constructed.

EXAMPLE EMBODIMENT

First Example Embodiment

In the following, an image processing apparatus, an image processing method, and a program in a first example embodiment of the invention will be described with reference to FIGS. 1 to 5.

Apparatus Configuration

Figure 1:
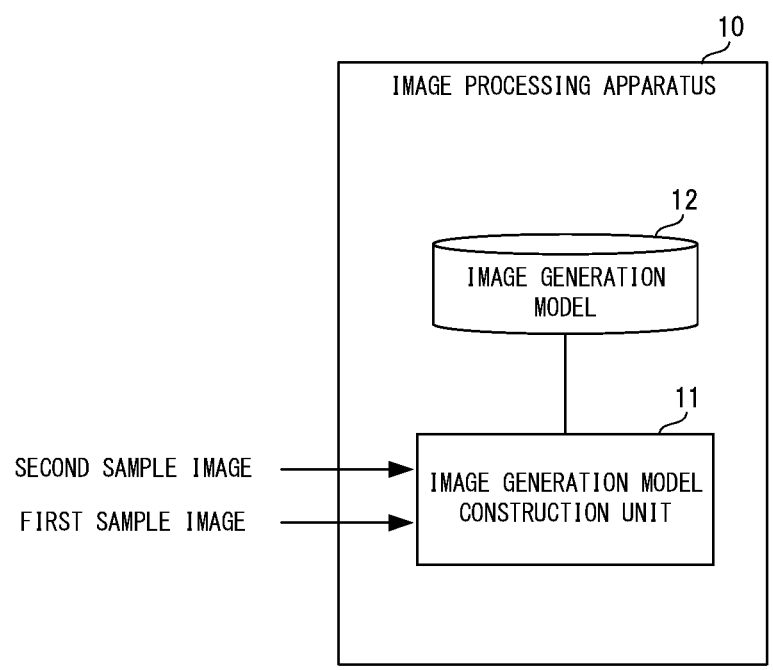
FIG. 1 is a block diagram illustrating a schematic configuration of an image processing apparatus in a first example embodiment of the invention.

First, a schematic configuration of the image processing apparatus in the first example embodiment will be described with reference to FIG. 1. FIG. 1 is a block diagram illustrating the schematic configuration of the image processing apparatus in the first example embodiment of the invention.

An image processing apparatus 10 in the first example embodiment illustrated in FIG. 1 is an apparatus for constructing a model for, in a case in which a part of a person appearing in an image is lost, interpolating the lost portion by image processing. As illustrated in FIG. 1, the image processing apparatus 10 includes an image generation model construction unit 11.

The image generation model construction unit 11 executes machine learning using a first sample image including an image of a person, a second sample image in which a part of the person in the first sample image is lost, and human body information specifying a posture of the person in the first sample image. The image generation model construction unit 11 generates and updates an image generation model 12 by performing this machine learning.

In such a manner, in the first example embodiment, an image generation model is constructed by machine learning being performed using, in addition to an image in which no part of a person is lost and an image in which a part of the person is lost, human body information of the person in the images. That is, according to the first example embodiment, a model for interpolating an image of a person a part of which is lost while taking a posture of the person into consideration is constructed. Furthermore, as a result of this, if the image generation model constructed according to the first example embodiment is used, interpolation taking a posture of the person into consideration is performed when an image in which a part of a person is lost is interpolated, and the problem that the posture of a person after interpolation is performed becomes unnatural is solved.

Figure 2:
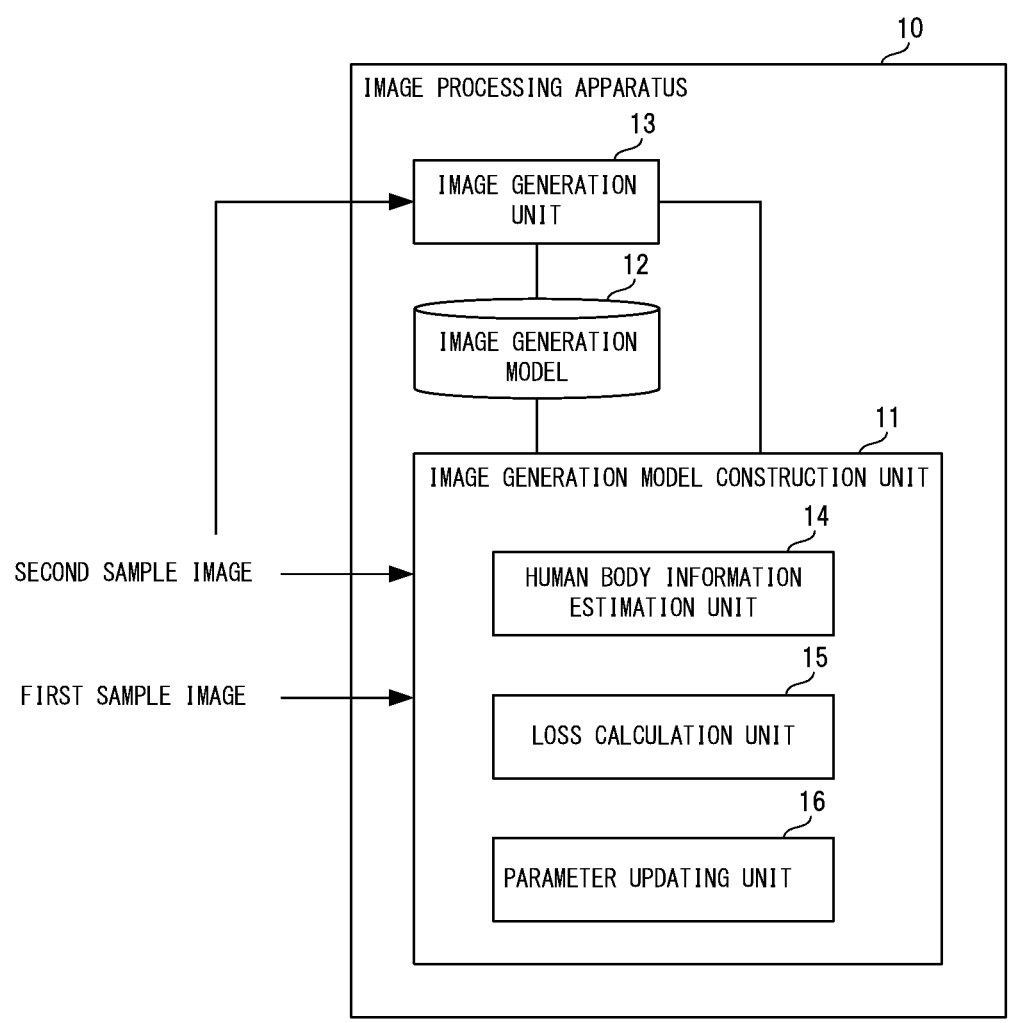
FIG. 2 is a block diagram specifically illustrating the configuration of the image processing apparatus in the first example embodiment of the invention.

Next, the configuration of the image processing apparatus 10 in the first example embodiment will be specifically described with reference to FIGS. 2 and 3. FIG. 2 is a block diagram specifically illustrating the configuration of the image processing apparatus in the first example embodiment of the invention.

As illustrated in FIG. 2, in the first example embodiment, the image processing apparatus 10 includes an image generation unit 13 in addition to the above-described image generation model construction unit 11. The image generation unit 13 applies the second sample image to the image generation model 12 and generates an image in which the lost part of the person has been interpolated.

As the image generation model 12, a convolutional neural network (CNN) can be mentioned, for example, in the first example embodiment. In this case, the image generation model 12 is formed from a large number of parameter groups set by machine learning. These parameters determine the weights and network structure in the CNN.

Furthermore, a CNN is one type of a neural network and is obtained by combining, in the form of a plurality of layers, layers that are collections of units also called neurons. As parameters, there are weight parameters that express the degree of connection between units. Furthermore, a CNN is characterized by the plurality of intermediate layers in the network including an intermediate layer that performs convolutional operations.

In addition, the network structure in a case as described herein in which an image is input and an image is output has a characteristic such that the input and output layers are wide (have a large number of neural network units) and the intermediate layers are narrow (have a small number of units). Thus, a sandglass-type CNN is used in the first example embodiment.

Note that, in the first example embodiment, a neural network other than a CNN as described above may be used as the image generation model, or a machine learning model constructed by a different type of machine learning may also be used as the image generation model.

Also, as illustrated in FIG. 2, the image generation model construction unit 11 includes a human body information estimation unit 14, a loss calculation unit 15, and a parameter updating unit 16 in the first example embodiment.

The human body information estimation unit 14, from the image (also indicated in the following as "interpolated image") generated by the image generation unit 13 using the second sample image as an input image, estimates human body information specifying a posture of the person in this image. In addition, the human body information estimation unit 14 can also estimate human body information specifying a posture of the person in the first sample image.

In the first example embodiment, "human body information" is information specifying a posture of a person in an image; specifically, skeleton information of the body of the person. Specifically, information formed from coordinates of joints forming the human body can be mentioned as human body information. Furthermore, as joints to be used as human body information, the neck, shoulder joints, elbows, wrists, hips (the roots of the legs), knees, ankles, etc., can be mentioned, and at least three joints are used in the present example embodiment.

Figure 3A:
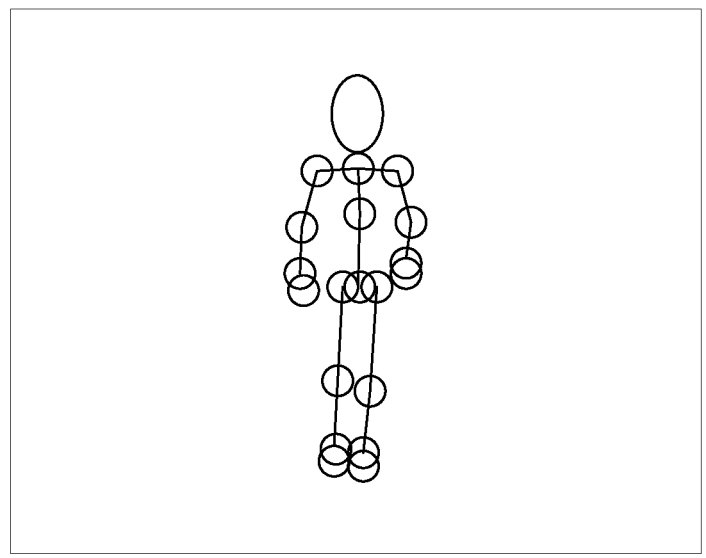
FIGS. 3A and 3B are diagrams illustrating a concept of human body information.
Figure 3B:
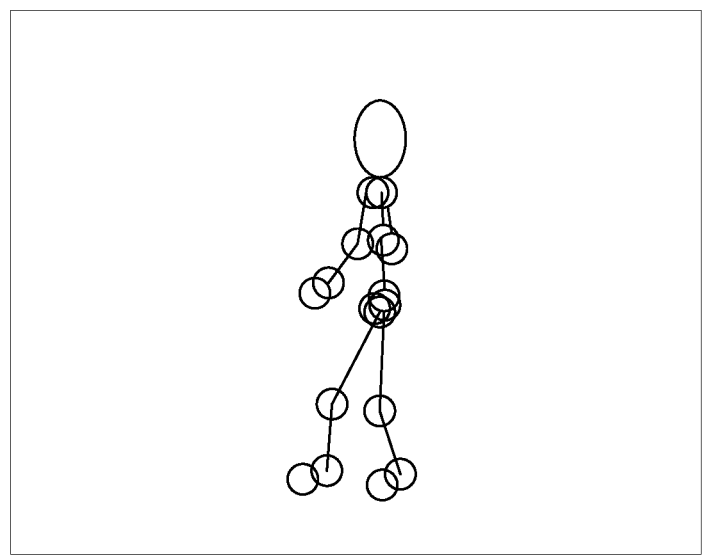

Specifically, as illustrated in FIGS. 3(a) and 3(b), the human body information estimation unit 14 detects joints of a person from images. The extracted joints are illustrated as circles in FIGS. 3(a) and 3(b). Furthermore, the human body information estimation unit 14 calculates the positions of the extracted joints as coordinates of a coordinate system set in an image plane, and creates human body information using the calculated coordinate values of the joints. FIGS. 3A and 3B are diagrams illustrating the concept of human body information.

Also, in the first example embodiment, the human body information estimation unit 14 can set vectors connecting the coordinates of adjacent joints, and can create human body information using the vectors that have been set. Furthermore, in a case in which the depths of joints can be detected, the human body information estimation unit 14 can calculate the coordinates of joints in a three-dimensional space, and create human body information using the calculated coordinate values of the joints in the three-dimensional space.

In addition, the human body information estimation unit 14 can also extract angles of joints from images and create human body information using the extracted angles. Furthermore, the human body information estimation unit 14 can also extract a silhouette image of a human body and set this silhouette image as human body information.

The loss calculation unit 15 calculates, as a human body loss, a loss in second human body information relative to human body information specifying the posture of the person in the first sample image. Also, the loss calculation unit 15 can calculate, as an image loss, a loss in the image generated by the image generation unit 13 using the second sample image as an input image, relative to the first sample image. In this case, the loss calculation unit 15 calculates a combined loss by adding the image loss to the human body loss.

For example, the loss calculation unit 15 calculates the human body loss L_body such that the value of the human body loss L_body decreases as the similarity between the human body information h' estimated from the second sample image and the human body information h obtained from the first sample image increases, and such that the value increases as the deviation between the human body information h' and the human body information h increases. Specifically, the loss calculation unit 15 can calculate the human body loss L_body using a model obtained by performing machine learning using a large amount of human body information as learning data. Furthermore, the loss calculation unit 15 can also calculate a loss for each human body portion and set the total of the obtained losses as the human body loss L_body.

In addition, the loss calculation unit 15 calculates the image loss L_diff such that the value of the image loss L_diff decreases as the similarity between the image x' generated by the image generation unit 13 when the second sample image is used as an input image and the first sample image y increases, and such that the value increases as the deviation between the image x' and the image y increases. Specifically, the loss calculation unit 15 can calculate the image loss L_diff using a model obtained by performing machine learning using a large number of images as learning data. Also, the loss calculation unit 15 can calculate an image loss for each of a plurality of sets of an image x' and an image y, and set the total of the image losses obtained as L_diff.

Furthermore, the loss calculation unit 15 calculates the combined loss Lg by adding the human body loss L_body and the image loss L_diff. Specifically, given coefficients λ_diff and λ_body, the loss calculation unit 15 can calculate the combined loss Lg using Formula 1 below. Also, "λ_reg× L_reg" may be additionally provided in Formula 1 below as a regularization factor for stabilizing the learning.

$$\text{Combined loss } L\_g = \lambda\_\text{diff} \times L\_\text{diff} + \lambda\_\text{body} \times L\_\text{body} \quad \text{(Formula 1)}$$

The parameter updating unit 16 updates the image generation model 12 based on the loss calculated by the loss calculation unit 15. Also, if the loss calculation unit 15 has calculated a combined loss, the parameter updating unit 16 updates the image generation model 12 based on the combined loss. Specifically, due to a later-described repetition of processing, the parameter groups of the CNN forming the image generation model 12 are updated so that the combined loss gradually decreases.

Specifically, in a case in which the image generation model 12 is a neural network, the parameter updating unit 16 can update the various parameters forming the neural network using backpropagation, for example.

Also, in the first example embodiment, the generation of an image using the second sample image as the input image, which is performed by the image generation unit 13, the estimation of human body information performed by the human body information estimation unit 14, the calculation of loss performed by the loss calculation unit 15, and the update of parameters performed by the parameter updating unit 16 are executed repeatedly. By such repetition of processing, the value of loss decreases, and the parameter values become suitable.

Apparatus Operations

Next, operations of the image processing apparatus 10 in the first example embodiment will be described with reference to FIGS. 4 to 6. FIGS. 1 to 3 will be referred to as needed in the following description. Also, in the first example embodiment, an image processing method is implemented by causing the image processing apparatus 10 to operate. Accordingly, the following description of the operations of the image processing apparatus 10 is substituted for the description of the image processing method in the first example embodiment.

First, processing for generating and updating an image generation model will be described. FIG. 4 is a flowchart illustrating operations of the image processing apparatus in the first example embodiment of the invention during the processing for generating and updating an image generation model.

Figure 4:
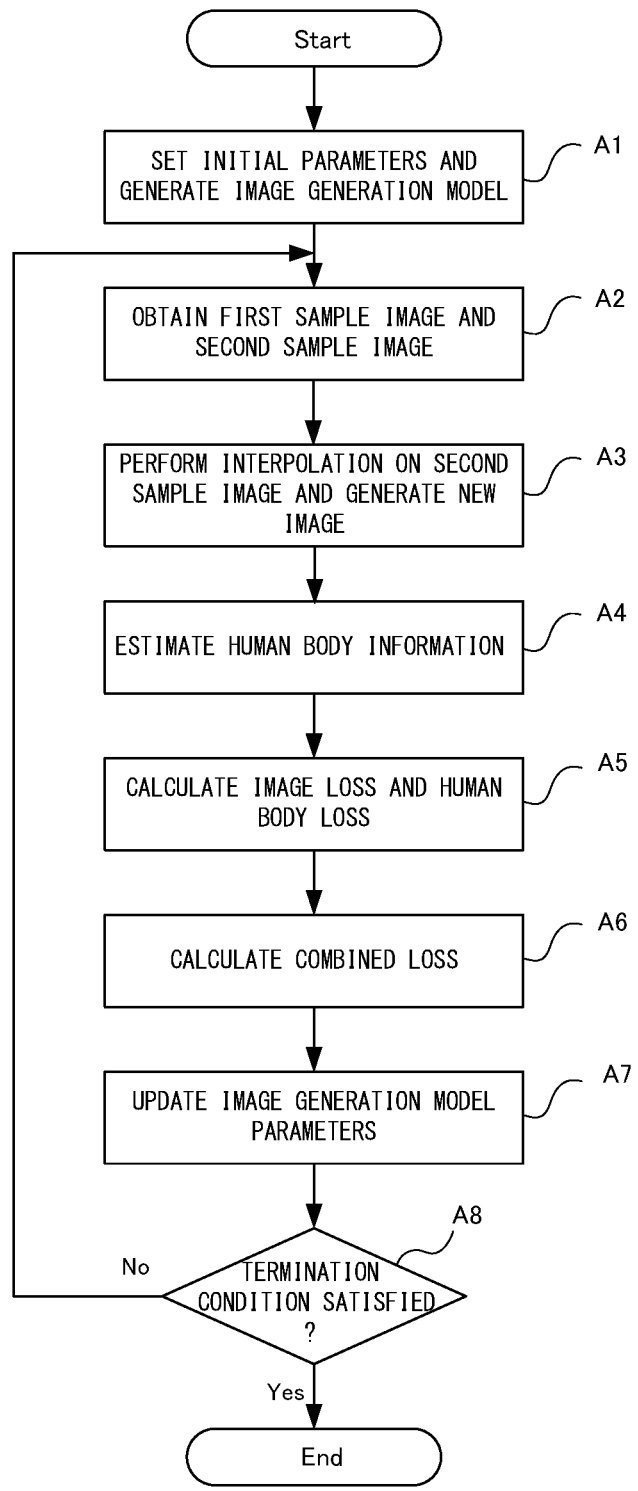
FIG. 4 is a flowchart illustrating operations of the image processing apparatus in the first example embodiment of the invention during processing for generating and updating an image generation model.

As illustrated in FIG. 4, first, the image generation model construction unit 11 sets initial values to parameter groups of a CNN that becomes an image generation model 12, and generates an image generation model 12 that is in an initial state (step A1).

Next, the image generation model construction unit 11 obtains, as learning data, a first sample image including an image of a person, and a second sample image in which a part of the person in the first sample image is lost (step A2).

Next, the image generation model construction unit 11 sends the second sample image obtained in step A2 to the image generation unit 13, and instructs the image generation unit 13 to interpolate the lost portion of the second sample image. Accordingly, the image generation unit 13 performs interpolation on the second sample image using the image generation model 12, and generates a new image (step A3). Furthermore, the image generation unit 13 sends the generated new image to the image generation model construction unit 11.

Next, in the image generation model construction unit 11, the human body information estimation unit 14 performs, on the new image generated in step A3, estimation of human body information specifying a posture of the person in the image (step A4). Also, in a case in which human body information has not been estimated in advance from the first sample image obtained in step A2, the human body information estimation unit 14 also estimates human body information specifying a posture of the person in the first sample image.

Next, the loss calculation unit 15 calculates an image loss using the first sample image and the second sample image obtained in step A2, and further calculates a human body loss using the human body information in each of the first sample image and the second sample image (step A5).

Next, the loss calculation unit 15 applies the image loss and the human body loss calculated in step A5 to Formula 1 above, and calculates a combined loss (step A6).

Next, the parameter updating unit 16 updates the image generation model 12 based on the combined loss calculated in step A6 (step A7). Specifically, the parameter updating unit 16, by repeating the later-described steps A2 to A7, updates the parameter groups of the CNN forming the image generation model 12 so that the combined loss gradually decreases.

Next, once step A7 is executed, the image generation model construction unit 11 determines whether or not a termination condition is satisfied (step A8). If the result of the determination in step A8 is that the termination condition is not satisfied, the image generation model construction unit 11 executes step A2 again. On the other hand, if the result of the determination in step A8 is that the termination condition is satisfied, the image generation model construction unit 11 terminates processing.

As the termination condition in step A8, conditions such as the number of times steps A2 to A8 have been repeated has reached a number of times set in advance, the amount of decrease of the combined loss calculated in step A6 has become less than a threshold, etc., can be mentioned.

Also, Formula 1 above is used in step A6 as mentioned above. It is beneficial that the values of the coefficients $\lambda\_diff$ and $\lambda\_body$ in Formula 1 above be set starting from 0 and so that the values are increased as the number of repetitions increases. This is because the interpolation accuracy of the image generated in step A3 is low in an early stage of repetition. Furthermore, the coefficients $\lambda\_diff$ and $\lambda\_body$ can be expressed using a monotonically increasing function such as the sigmoid function.

Also, the number of first sample images and the number of second sample images obtained in step A2 may each be one, or two or more. In the latter case, each step is performed for every two or more pieces of images. In this case, in step A5, the loss calculation unit 15 calculates the total of image losses calculated for each set of corresponding sample images, and sets the obtained value as an image loss. With regard to human body loss, the loss calculation unit 15 similarly calculates a total, and sets the obtained value as a human body loss.

Effects of First Example Embodiment

Figure 5A:
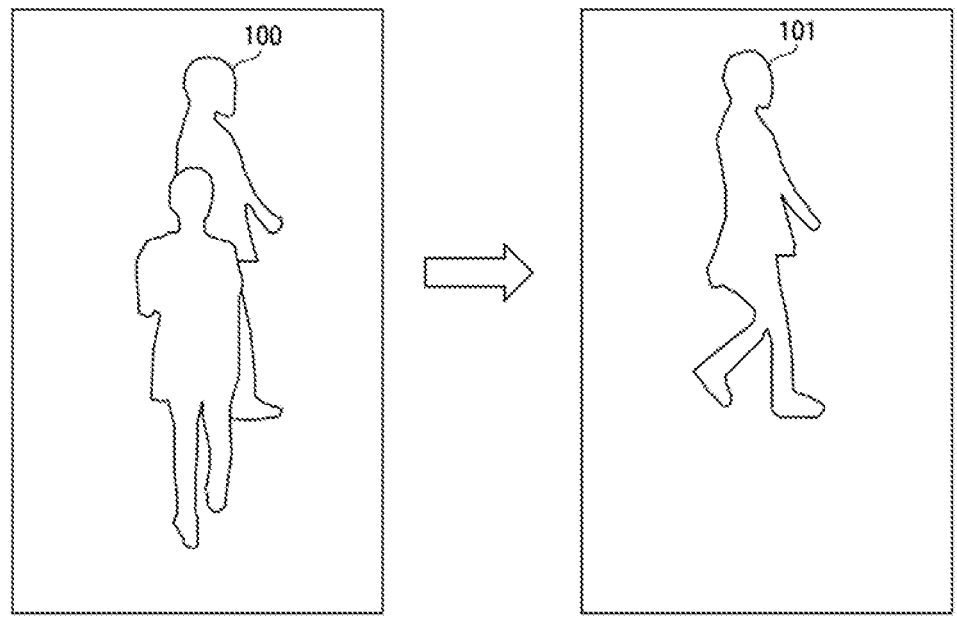
FIG. 5A illustrates an example in which an image of a person a part of which is lost is interpolated using a conventional technique.

Here, the effects in the first example embodiment will be described with reference to FIG. 5. FIG. 5A illustrates an example in which an image of a person a part of which is lost is interpolated using a conventional technique, and FIG. 5B illustrates an example in which an image of a person a part of which is lost is interpolated using the image processing apparatus in the first example embodiment of the invention.

Figure 5B:
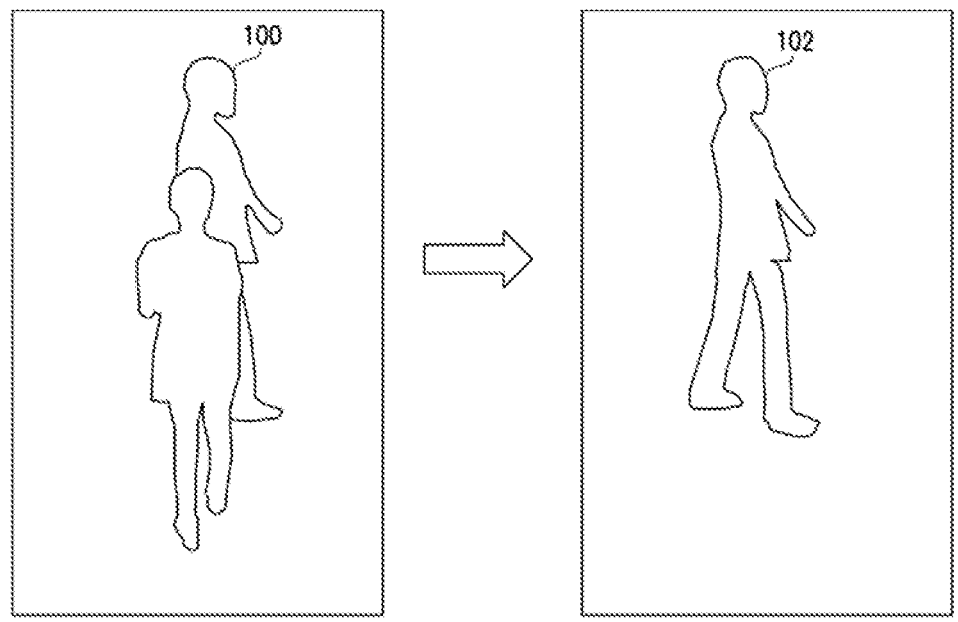
FIG. 5B illustrates an example in which an image of a person a part of which is lost is interpolated using the image processing apparatus in the first example embodiment of the invention.

In FIGS. 5A and 5B, "100" indicates a processing-target image of a person. A part of the body of the person 100 is masked by another person, and is lost. In this case, when the conventional technique is used, the posture of the person 101 after interpolation is performed is unnatural as illustrated in FIG. 5A because human body information is not used in the construction of an image generation model. In contrast, according to the image processing apparatus 10 in the first example embodiment, the posture of the person 102 after interpolation is performed is natural as illustrated in FIG. 5B because human body information is used in the construction of the image generation model 12.

As described above, in the first example embodiment, for the interpolation of an image of a person a part of which is lost, the image generation model 12 is constructed taking the posture of the person into consideration. In addition, interpolation accuracy is improved because the image generation model 12 is updated by machine learning using images for learning. As a result of this, the problem that the posture of a person after interpolation is performed becomes unnatural is solved if the image generation model constructed according to the first example embodiment is used, and thus the performance of a monitoring system, etc., will be improved.

Program

It suffices for the program in the first example embodiment to be a program that causes a computer to execute steps A1 to A8 illustrated in FIG. 4. By installing this program on a computer and executing the program, the image processing apparatus 10 and the image processing method in the first example embodiment can be realized. In this case, the processor of the computer functions and performs processing as the image generation model construction unit 11 and the image generation unit 13.

Also, the program in the present example embodiment may be executed by a computer system formed from a plurality of computers. In this case, the computers may each function as one of the image generation model construction unit 11 and the image generation unit 13, for example.

Second Example Embodiment

Next, an image processing apparatus, an image processing method, and a program in a second example embodiment of the invention will be described with reference to FIGS. 6 and 7.

Apparatus Configuration

First, a configuration of the image processing apparatus in the second example embodiment will be described with reference to FIG. 6. FIG. 6 is a block diagram illustrating the configuration of the image processing apparatus in the second example embodiment of the invention.

Figure 6:
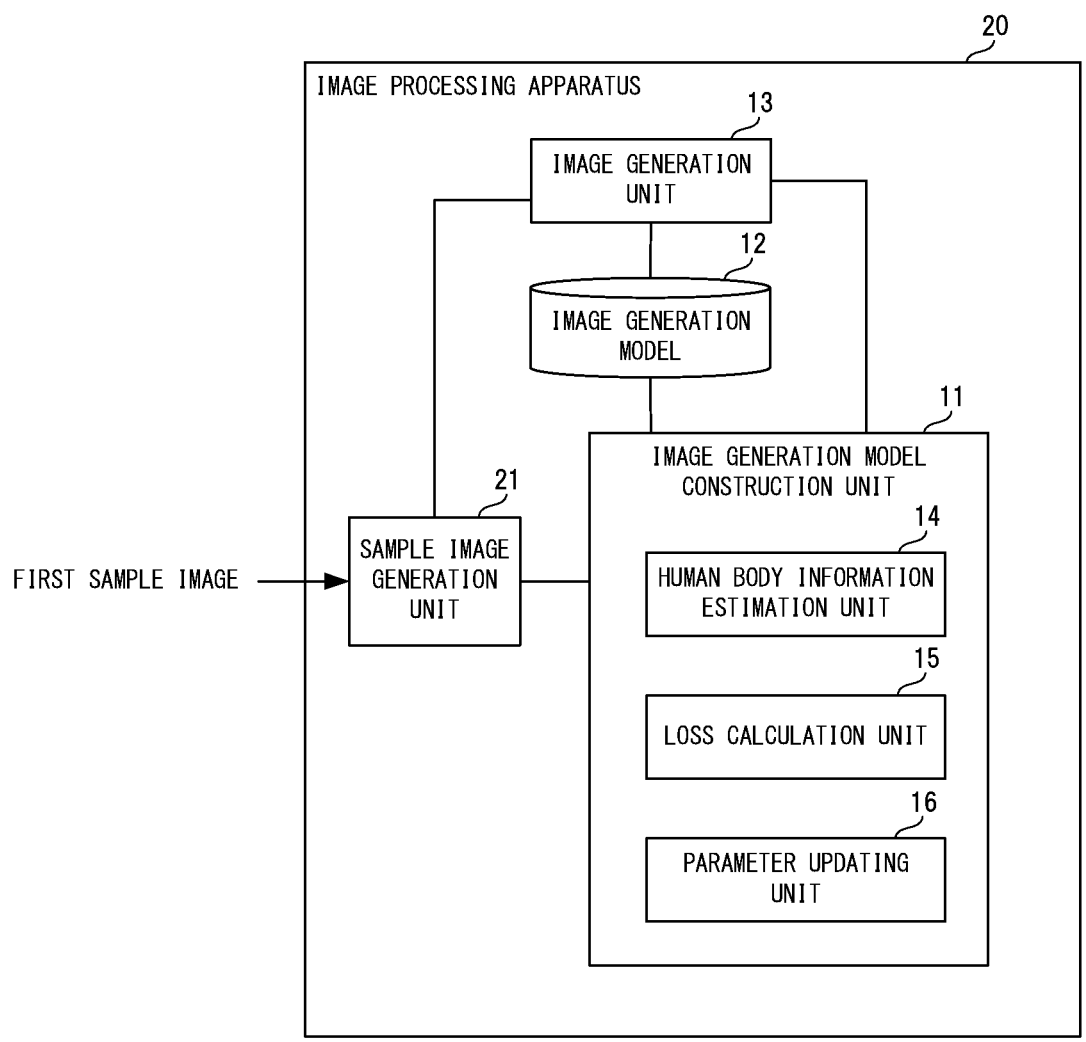
FIG. 6 is a block diagram illustrating a configuration of an image processing apparatus in a second example embodiment of the invention.

As illustrated in FIG. 6, an image processing apparatus 20 in the second example embodiment includes a sample image generation unit 21 in addition to the configuration of the image processing apparatus 10 in the first example embodiment, which is illustrated in FIG. 2. Other than this, the image processing apparatus 20 is configured similarly as the image processing apparatus 10 in the first example embodiment. In the following, description will be provided focusing on the differences from the first example embodiment.

First, the sample image generation unit 21 has a function of generating a second sample image from a first sample image. Furthermore, based on a result of a calculation by the loss calculation unit 15, the sample image generation unit 21 sets a degree of loss of a person in the second sample image that is to be generated.

Specifically, the sample image generation unit 21 detects a human body portion from a first sample image in which no part of a human body is lost, and adds an image of a masking object to the first sample image so that a part of the detected human body portion is masked. Furthermore, the image generated by the sample image generation unit 21 is treated as a second sample image in the generation and updating of an image generation model.

Apparatus Operations

Next, operations of the image processing apparatus 20 in the second example embodiment will be described with reference to FIG. 7. FIG. 6 will be referred to as needed in the following description. FIG. 7 is a flowchart illustrating operations of the image processing apparatus in the second example embodiment of the invention during processing for generating and updating an image generation model. In addition, also in the second example embodiment, an image processing method is implemented by causing the image processing apparatus 20 to operate. Accordingly, the following description of the operations of the image processing apparatus 20 is substituted for the description of the image processing method in the second example embodiment.

Figure 7:
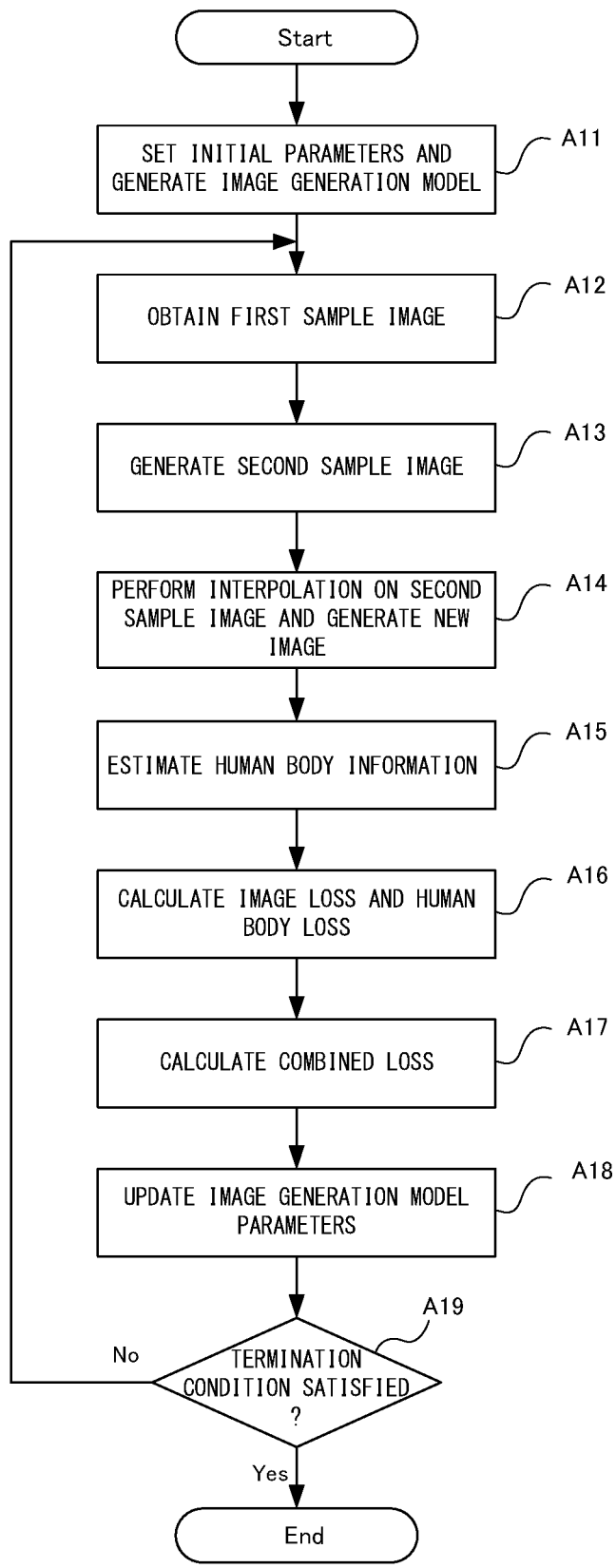
FIG. 7 is a flowchart illustrating operations of the image processing apparatus in the second example embodiment of the invention during processing for generating and updating an image generation model.

As illustrated in FIG. 7, first, the image generation model construction unit 11 sets initial values to parameter groups of a CNN that becomes an image generation model 12, and generates the image generation model 12 (step A11). Step A11 is similar to step A1 illustrated in FIG. 4.

Next, the sample image generation unit 21 obtains, as learning data, a first sample image including an image of a person (step A12). Furthermore, the sample image generation unit 21 passes the obtained first sample image to the image generation model construction unit 11.

Next, the sample image generation unit 21 generates, from the first sample image obtained in step A12, a second sample image in which a part of the person in the first sample image is lost (step A13).

Also, in step A13, the sample image generation unit 21 sets the degree of loss of the person in the second sample image that is to be generated based on the result of the calculation in step A17 if step A17 has already been executed. For example, the greater the loss is, the smaller the degree of the loss that the sample image generation unit 21 sets.

Next, the image generation model construction unit 11 sends the second sample image generated in step A13 to the image generation unit 13, and instructs the image generation unit 13 to interpolate the lost portion of the second sample image. Accordingly, the image generation unit 13 performs interpolation on the second sample image, and generates a new image (step A14). Step A14 is similar to step A3 illustrated in FIG. 4.

Next, in the image generation model construction unit 11, the human body information estimation unit 14 performs, on the new image generated in step A14, estimation of human body information specifying a posture of the person in the image (step A15). Step A15 is similar to step A4 illustrated in FIG. 4.

Next, the loss calculation unit 15 calculates an image loss using the first sample image obtained in step A12 and the second sample image generated in step A13, and further calculates a human body loss using the human body information in each of the first sample image and the second sample image (step A16). Step A16 is similar to step A5 illustrated in FIG. 4.

Next, the loss calculation unit 15 applies the image loss and the human body loss calculated in step A16 to Formula 1 above, and calculates a combined loss (step A17). Step A17 is similar to step A6 illustrated in FIG. 4.

Next, the parameter updating unit 16 updates the image generation model 12 based on the combined loss calculated in step A17 (step A18). Step A18 is similar to step A7 illustrated in FIG. 4.

Next, once step A18 is executed, the image generation model construction unit 11 determines whether or not the termination condition is satisfied (step A19). If the result of the determination in step A19 is that the termination condition is not satisfied, the image generation model construction unit 11 executes step A12 again. On the other hand, if the result of the determination in step A19 is that the termination condition is satisfied, the image generation model construction unit 11 terminates processing. Step A19 is similar to step A8 illustrated in FIG. 4.

Effects of Second Example Embodiment

In such a manner, according to the second example embodiment, there is no need to prepare an image in which a part of a person in the image is lost as a sample image. Thus, the construction of the image generation model 12 becomes easier compared with the first example embodiment, and the cost required for preparing sample images and constructing the image generation model 12 can be reduced. In addition, the effects described in the first example embodiment can be achieved also in the second example embodiment.

Program

It suffices for the program in the second example embodiment to be a program that causes a computer to execute steps A11 to A19 illustrated in FIG. 7. By installing this program on a computer and executing the program, the image processing apparatus 20 and the image processing method in the second example embodiment can be realized. In this case, the processor of the computer functions and performs processing as the image generation model construction unit 11, the image generation unit 13, and the sample image generation unit 21.

Also, the program in the present example embodiment may be executed by a computer system formed from a plurality of computers. In this case, the computers may each function as one of the image generation model construction unit 11, the image generation unit 13, and the sample image generation unit 21, for example.

Third Example Embodiment

Next, an image processing apparatus, an image processing method, and a program in a third example embodiment of the invention will be described with reference to FIGS. 8 and 9.

Apparatus Configuration

First, a configuration of the image processing apparatus in the third example embodiment will be described with reference to FIG. 8. FIG. 8 is a block diagram illustrating the configuration of the image processing apparatus in the third example embodiment of the invention.

Figure 8:
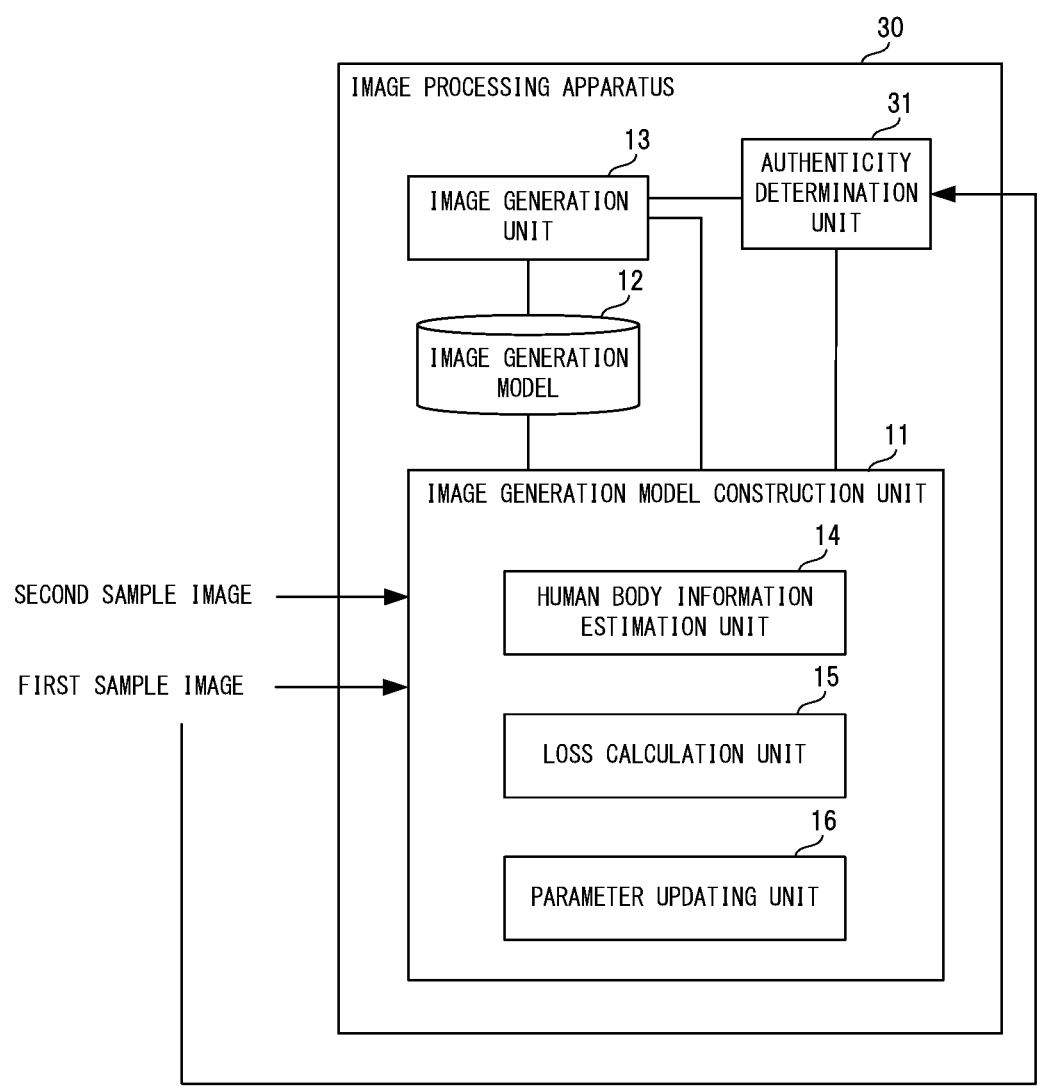
FIG. 8 is a block diagram illustrating a configuration of an image processing apparatus in a third example embodiment of the invention.

As illustrated in FIG. 8, an image processing apparatus 30 in the third example embodiment includes an authenticity determination unit 31 in addition to the configuration of the image processing apparatus 10 in the first example embodiment, which is illustrated in FIG. 2. Furthermore, due to this, the function of the loss calculation unit 15 also differs from that in the first example embodiment. Other than this, the image processing apparatus 30 is configured similarly as the image processing apparatus 10 in the first example embodiment. In the following, description will be provided focusing on the differences from the first example embodiment.

The authenticity determination unit 31 determines the degree of difference between a first sample image and an image (interpolated image) generated by the image generation unit 13 using a second sample image as an input image. Specifically, when the interpolated image x' and the first sample image y are input, the authenticity determination unit 31 uses an authenticity determination model constructed by machine learning to calculate the degree of difference, specifically an authenticity loss $L\_adv$. Furthermore, in a case in which there are a plurality of sets of a first sample image and an interpolated image, the authenticity determination unit 31 sets the total of losses calculated for each set as the authenticity loss $L\_adv$.

Similarly to the image generation model 12, a CNN can be mentioned as the authenticity determination model, for example. Specifically, the authenticity determination unit 31 constructs an authenticity determination model using a result obtained by performing a determination of authenticity on an image A serving as learning data, and authenticity information indicating whether or not the image A is an interpolated image generated by the image generation unit 13.

Furthermore, the authenticity determination unit 31 can update parameter groups of the authenticity determination model based on the result of the determination performed on the first sample image and the interpolated image, and correct answer information for the determination. Specifically, the authenticity determination unit 31 updates the parameter groups so that the authenticity loss $L\_adv$ decreases. In addition, the correct answer information is prepared in advance by an administrator, etc.

Also, in a case in which the authenticity determination model is a neural network, the authenticity determination unit 31 can update the various parameters forming the neural network using backpropagation, for example.

Furthermore, in the third example embodiment, the loss calculation unit 15 further calculates, as an authenticity loss, a loss in the interpolated image obtained from the second sample image relative to the first sample image, based on the result of the determination performed by the authenticity determination unit 31. In addition, in the third example embodiment, the loss calculation unit 15 calculates a combined loss by adding the authenticity loss to a human body loss.

Specifically, in the present example embodiment, the loss calculation unit 15 can calculate the combined loss Lg by adding the image loss $L\_diff$ and the authenticity loss $L\_adv$ calculated by the authenticity determination unit 31. Specifically, given coefficients $\lambda\_diff$ and $\lambda\_adv$, the loss calculation unit 15 can calculate the combined loss Lg using Formula 2 below. Also, "$\lambda\_reg \times L\_reg$" is additionally provided in Formula 2 below as a regularization factor for stabilizing the learning.

$$\text{Combined loss } L\_g = \lambda\_diff \times L\_diff - \lambda\_adv \times L\_adv + \lambda\_body \times L\_body + \lambda\_reg \times L\_reg \quad \text{(Formula 2)}$$

In the third example embodiment, the parameter updating unit 16 updates the parameters of the image generation model 12 based on the combined loss calculated based on Formula 2 above.

Apparatus Operations

Next, operations of the image processing apparatus 30 in the third example embodiment will be described with reference to FIG. 9. FIG. 8 will be referred to as needed in the following description. FIG. 9 is a flowchart illustrating operations of the image processing apparatus in the third example embodiment of the invention during processing for generating and updating an image generation model. In addition, also in the third example embodiment, an image processing method is implemented by causing the image processing apparatus 30 to operate. Accordingly, the following description of the operations of the image processing apparatus 30 is substituted for the description of the image processing method in the third example embodiment.

Figure 9:
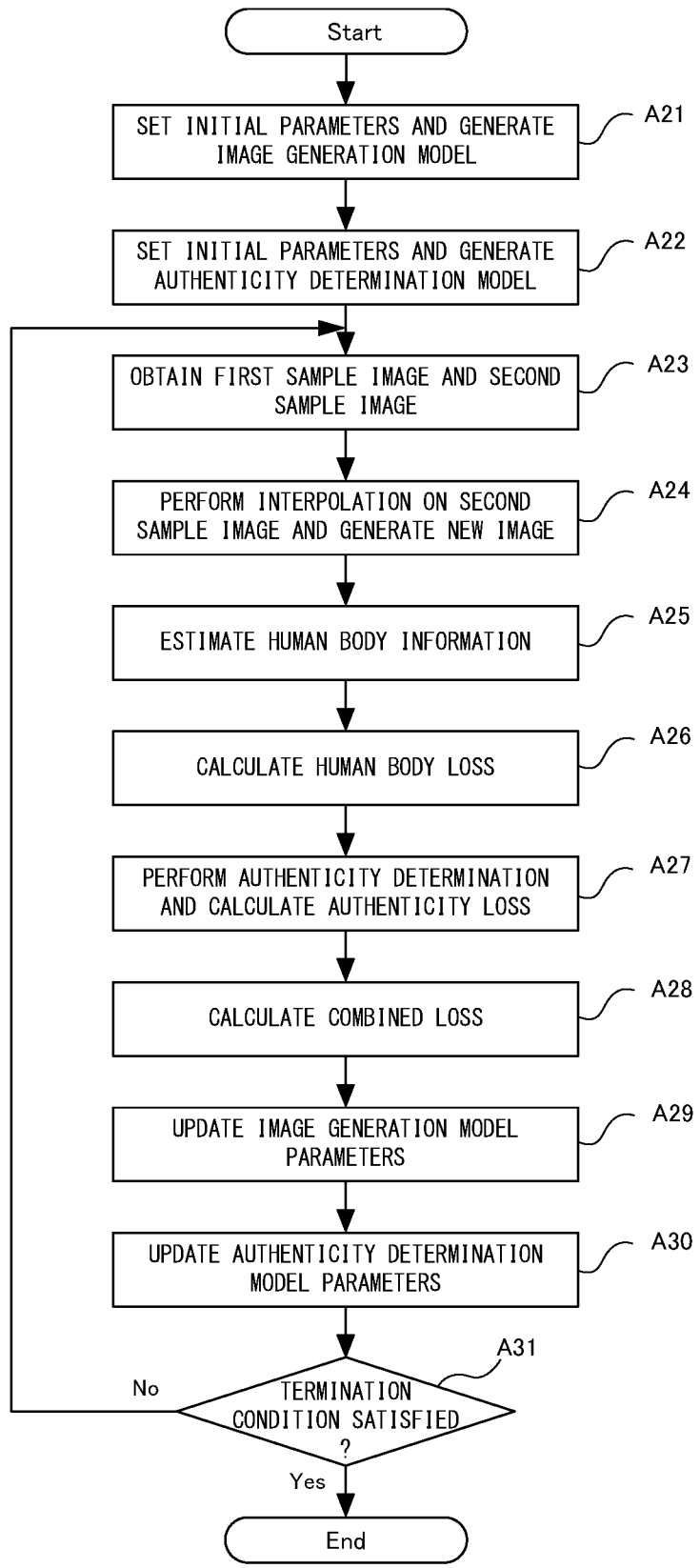
FIG. 9 is a flowchart illustrating operations of the image processing apparatus in the third example embodiment of the invention during processing for generating and updating an image generation model.

As illustrated in FIG. 9, first, the image generation model construction unit 11 sets initial values to parameter groups of a CNN that becomes an image generation model 12, and generates the image generation model 12 (step A21). Step A21 is similar to step A1 illustrated in FIG. 4.

Next, the authenticity determination unit 31 sets initial values to parameter groups of a CNN that becomes an authenticity determination model, and generates the authenticity determination model (step A22).

Next, the image generation model construction unit 11 obtains a first sample image including an image of a person, and a second sample image in which a part of the person in the first sample image is lost (step A23). Step A23 is similar to step A2 illustrated in FIG. 4.

Next, the image generation model construction unit 11 sends the second sample image obtained in step A22 to the image generation unit 13, and instructs the image generation unit 13 to interpolate the lost portion of the second sample image. Accordingly, the image generation unit 13 performs interpolation on the second sample image, and generates a new image (step A24). Furthermore, the image generation unit 13 sends the generated new image to the image generation model construction unit 11. Step A24 is similar to step A3 illustrated in FIG. 4.

Next, in the image generation model construction unit 11, the human body information estimation unit 14 performs, on the new image generated in step A24 estimation of human body information specifying a posture of the person in the image (step A25). Step A25 is similar to step A4 illustrated in FIG. 4.

Next, the loss calculation unit 15 calculates a human body loss using the human body information in each of the first sample image and the second sample image obtained in step A23 (step A26). Step A26 is similar to step A5 illustrated in FIG. 4.

Next, the authenticity determination unit 31 determines the degree of difference between the first sample image obtained in step A23 and the interpolated image generated in step A24, and calculates an authenticity loss L_adv (step A27).

Next, the loss calculation unit 15 applies the human body loss calculated in step A26 and the authenticity loss calculated in step A27 to Formula 2 above, and calculates a combined loss (step A28).

Next, the parameter updating unit 16 updates the image generation model 12 based on the combined loss calculated in step A28 (step A29). Step A29 is similar to step A7 illustrated in FIG. 4.

Next, the authenticity determination unit 31 updates the parameter groups of the authenticity determination model using correct answer information prepared in advance for the determination performed in step A27, and the authenticity loss calculated in step A27 (step A30).

Next, once step A30 is executed, the image generation model construction unit 11 determines whether or not the termination condition is satisfied (step A31). If the result of the determination in step A31 is that the termination condition is not satisfied, the image generation model construction unit 11 executes step A23 again. On the other hand, if the result of the determination in step A31 is that the termination condition is satisfied, the image generation model construction unit 11 terminates processing. Step A31 is similar to step A8 illustrated in FIG. 4.

Effects of Third Example Embodiment

In such a manner, according to the third example embodiment, the parameters of the image generation model are updated based on a result of a determination of whether or not the interpolated image is an interpolated image. Accordingly, the effects described in the first example embodiment can be achieved also in the third example embodiment.

Program

It suffices for the program in the third example embodiment to be a program that causes a computer to execute steps A21 to A31 illustrated in FIG. 9. By installing this program on a computer and executing the program, the image processing apparatus 30 and the image processing method in the third example embodiment can be realized. In this case, the processor of the computer functions and performs processing as the image generation model construction unit 11, the image generation unit 13, and the authenticity determination unit 31.

Also, the program in the present example embodiment may be executed by a computer system formed from a plurality of computers. In this case, the computers may each function as one of the image generation model construction unit 11, the image generation unit 13, and the authenticity determination unit 31 for example.

Physical Configuration

Figure 10:
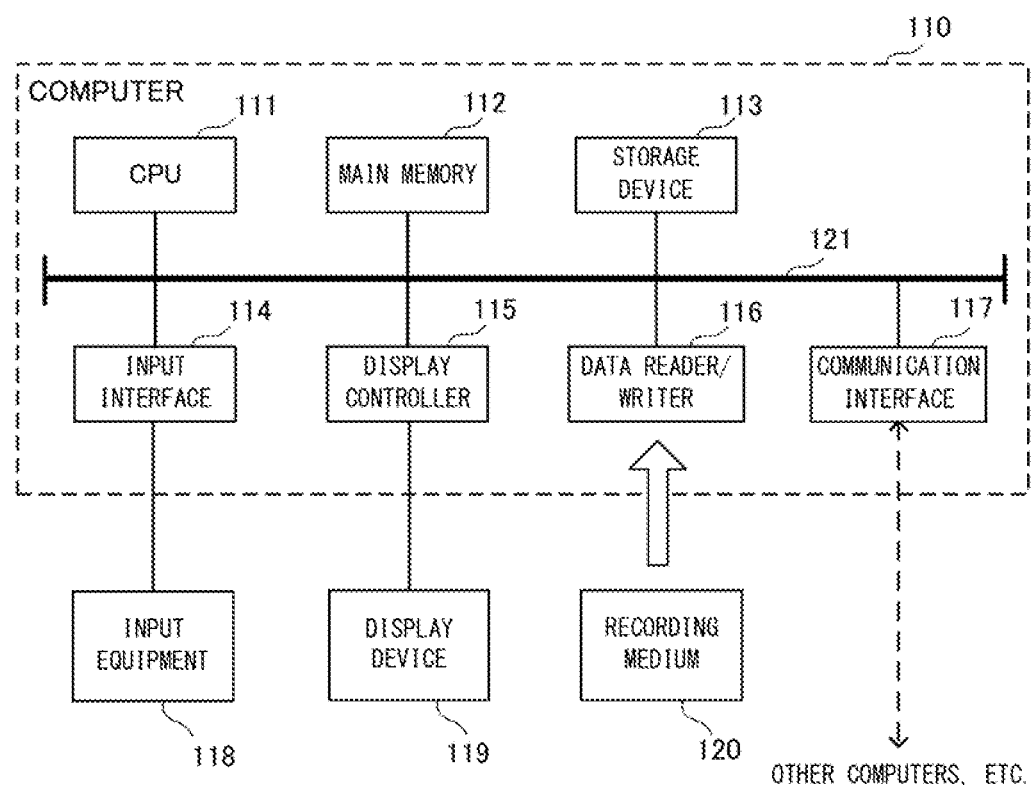
FIG. 10 is a diagram illustrating one example of a computer realizing the image processing apparatuses in the first to third example embodiments of the invention.

Here, a computer for realizing the image processing devices by executing the program in the first to third example embodiments will be described with reference to FIG. 10. FIG. 10 is a block diagram showing an example of the computer that realizes the image processing devices according to the first to third example embodiments of the present invention.

As shown in FIG. 10, a computer 110 includes a CPU 111, a main memory 112, a storage device 113, an input interface 114, a display controller 115, a data reader/writer 116, and a communication interface 117. These constituent elements are connected via a bus 121 to enable mutual data communication. Note that the computer 110 may also include a GPU (Graphics Processing Unit) or an FPGA (Field-Programmable Gate Array) in addition to or in place of the CPU 111.

The CPU 111 carries out various types of calculation by deploying, in the main memory 112, a program (codes) in this example embodiment stored in the storage device 113, and executing codes in a predetermined order. Typically, the main memory 112 is a volatile storage device such as a DRAM (Dynamic Random Access Memory). In addition, the program in this example embodiment is provided in a state of being stored in a computer-readable recording medium 120. Note that the program in this example embodiment may also be distributed on the Internet connected via the communication interface 117.

In addition, specific examples of the storage device 113 include a hard disk drive and a semiconductor storage device, such as a flash memory. The input interface 114 mediates data transmission between the CPU 111 and an input device 118 including a keyboard and a mouse. The display controller 115 is connected to a display device 119 to control display on the display device 119.

The data reader/writer 116 mediates data transmission between the CPU 111 and the recording medium 120, reads out a program from the recording medium 120, and writes a processing result of the computer 110 to the recording medium 120. The communication interface 117 mediates data transmission between the CPU 111 and another computer.

In addition, specific examples of the recording medium 120 include a general-purpose semiconductor storage device such as a Compact Flash (CF (registered trademark)) and a Secure Digital (SD), a magnetic recording medium such as a flexible disk, or an optical recording medium such as a Compact Disk Read Only Memory (CD-ROM).

Note that the image processing devices in the first to third example embodiments can also be realized by using items of hardware corresponding to various constituent elements, instead of a computer in which programs are installed. Furthermore, a configuration of the image processing devices in the first to third example embodiments may also be adopted in which a portion thereof is realized by a program, and the remaining portion is realized by hardware.

Part of or all of the above-described example embodiments can be expressed in the below-described Supplementary Notes 1 to 15, but the present invention is not limited to the below description.

Supplementary Note 1

An image processing apparatus including:
an image generation model construction unit configured to construct an image generation model for, using image data in which a part of a person is lost as an input image, generating an image in which the lost part of the person has been interpolated, wherein
the image generation model construction unit constructs the image generation model by machine learning in which a first sample image including an image of a person, a second sample image in which a part of the person in the first sample image is lost, and human body information specifying a posture of the person in the first sample image are used.

Supplementary Note 2

The image processing apparatus according to Supplementary Note 1, further including
an image generation unit configured to apply the second sample image to the image generation model to generate an image in which the lost part of the person has been interpolated, wherein
the image generation model construction unit includes:
a human body information estimation unit configured to estimate, from the image generated by the image generation unit, second human body information specifying a posture of the person in the image;
a loss calculation unit configured to calculate, as a human body loss, a loss in the second human body information relative to the human body information specifying the posture of the person in the first sample image; and
a parameter updating unit configured to update the image generation model based on the calculated loss.

Supplementary Note 3

The image processing apparatus according to Supplementary Note 2, wherein
the loss calculation unit
further calculates, as an image loss, a loss in the image generated by the image generation unit relative to the first sample image, and
calculates a combined loss by adding the image loss to the human body loss, and
the parameter updating unit updates a parameter of the image generation model based on the calculated combined loss.

Supplementary Note 4

The image processing apparatus according to Supplementary Note 2, further including
an authenticity determination unit configured to determine a degree of difference between the first sample image and the image generated by the image generation unit, wherein
the loss calculation unit, based on the result of the determination by the authenticity determination unit, further calculates, as an authenticity loss, a loss in the image generated by the image generation unit relative to the first sample image, and
calculates a combined loss by adding the authenticity loss to the human body loss, and
the parameter updating unit updates a parameter of the image generation model based on the calculated combined loss.

Supplementary Note 5

The image processing apparatus according to any one of Supplementary Notes 2 to 4, further including
a sample image generation unit configured to generate the second sample image from the first sample image, wherein
based on the result of the calculation by the loss calculation unit, the sample image generation unit sets a degree of loss of the person in the second sample image that is to be generated.

Supplementary Note 6

An image processing method including
(a) a step of constructing an image generation model for, using image data in which a part of a person is lost as an input image, generating an image in which the lost part of the person has been interpolated, wherein
in the (a) step, the image generation model is constructed by machine learning in which a first sample image including an image of a person, a second sample image in which a part of the person in the first sample image is lost, and human body information specifying a posture of the person in the first sample image are used.

Supplementary Note 7

The image processing method according to Supplementary Note 6, further including
(b) a step of applying the second sample image to the image generation model and generating an image in which the lost part of the person has been interpolated, wherein
the step (a) further includes:
(a1) a step of estimating, from the image generated by the step (b), second human body information specifying a posture of the person in the image;
(a2) a step of calculating, as a human body loss, a loss in the second human body information relative to the human body information specifying the posture of the person in the first sample image; and
(a3) a step of updating the image generation model based on the calculated loss.

Supplementary Note 8

The image processing method according to Supplementary Note 7, wherein
the step (a) further includes:

(a4) a step of calculating, as an image loss, a loss in the image generated by the step (b) relative to the first sample image, and calculating a combined loss by adding the image loss to the human body loss, and in the step (a3), a parameter of the image generation model is updated based on the calculated combined loss.

Supplementary Note 9

The image processing method according to Supplementary Note 7, further including (c) a step of determining a degree of difference between the first sample image and the image generated by the step (b), wherein the step (a) further includes:

(a4) a step of, based on the result of the determination by the step (c), calculating, as an authenticity loss, a loss in the image generated by the step (b) relative to the first sample image, and calculating a combined loss by adding the authenticity loss to the human body loss, and in the step (a3), a parameter of the image generation model is updated based on the calculated combined loss.

Supplementary Note 10

The image processing method according to any one of Supplementary Notes 7 to 9, further including (d) a step of generating the second sample image from the first sample image, and in the generation of the second sample image, setting, based on the result of the calculation by the step (a), a degree of loss of the person in the second sample image that is to be generated.

Supplementary Note 11

A computer readable recording medium that includes a program recorded thereon, the program including instructions that cause a computer to carry out:

(a) a step of constructing an image generation model for, using image data in which a part of a person is lost as an input image, generating an image in which the lost part of the person has been interpolated, wherein in the (a) step, the image generation model is constructed by machine learning in which a first sample image including an image of a person, a second sample image in which a part of the person in the first sample image is lost, and human body information specifying a posture of the person in the first sample image are used.

Supplementary Note 12

The computer readable recording medium according to Supplementary Note 11, wherein the program includes instructions for causing the computer to further carry out:

(b) a step of applying the second sample image to the image generation model and generating an image in which the lost part of the person has been interpolated, and to further carry out, in the step (a), (a1) a step of estimating, from the image generated by the step (b), second human body information specifying a posture of the person in the image;

(a2) a step of calculating, as a human body loss, a loss in the second human body information relative to the human body information specifying the posture of the person in the first sample image; and (a3) a step of updating the image generation model based on the calculated loss.

Supplementary Note 13

The computer readable recording medium according to Supplementary Note 12, wherein the program includes instructions for causing the computer to further carry out, in the step (a), (a4) a step of calculating, as an image loss, a loss in the image generated by the step (b) relative to the first sample image, and calculating a combined loss by adding the image loss to the human body loss, and in the step (a3), a parameter of the image generation model is updated based on the calculated combined loss.

Supplementary Note 14

The computer readable recording medium according to Supplementary Note 12, wherein the program includes instructions for causing the computer to further carry out:

(c) a step of determining a degree of difference between the first sample image and the image generated by the step (b), and to further carry out, in the step (a), (a4) a step of, based on the result of the determination by the step (c), calculating, as an authenticity loss, a loss in the image generated by the step (b) relative to the first sample image, and calculating a combined loss by adding the authenticity loss to the human body loss, and in the step (a3), a parameter of the image generation model is updated based on the calculated combined loss.

Supplementary Note 15

The computer readable recording medium according to any one of Supplementary Notes 12 to 14, wherein the program includes instructions for causing the computer to further carry out (d) a step of generating the second sample image from the first sample image, and in the generation of the second sample image, setting, based on the result of the calculation by the step (a), a degree of loss of the person in the second sample image that is to be generated.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

INDUSTRIAL APPLICABILITY

As described above, according to the invention, a model for interpolating an image of a person a part of which is lost while taking the posture of the person into consideration can be constructed. The invention is useful in various systems, for example a monitoring system, in which it is necessary to remove masking of a person in a video.

REFERENCE SIGNS LIST

10 Image processing apparatus (first example embodiment)
11 Image generation model construction unit
12 Image generation model
13 Image generation unit
14 Human body information estimation unit
15 Loss calculation unit
16 Parameter updating unit
20 Image processing apparatus (second example embodiment)
21 Sample image generation unit
30 Image processing apparatus (third example embodiment)
31 Authenticity determination unit
110 Computer
111 CPU
112 Main memory
113 Storage device
114 Input interface
115 Display controller
116 Data reader/writer
117 Communication interface
118 Input equipment
119 Display device
120 Recording medium
121 Bus

What is claimed is:

1. An image processing apparatus comprising:
a memory storing instructions; and
at least one hardware processor configured to execute the instructions to implement:
constructing an image generation model for, using image data in which a part of a person is lost as an input image, generating an image in which the lost part of the person has been interpolated, wherein constructing the image generation model comprises construction by machine learning in which a first sample image including an image of a person, a second sample image in which a part of the person in the first sample image is lost, and human body information specifying a posture of the person in the first sample image are used; and
applying the second sample image to the image generation model to generate an image in which the lost part of the person has been interpolated, wherein
constructing the image generation model further comprises
estimating, from the image, second human body information specifying a posture of the person in the image;
calculating, as a human body loss, a loss in the second human body information relative to the human body information specifying the posture of the person in the first sample image; and
updating the image generation model based on the calculated loss.

2. The image processing apparatus according to claim 1, wherein the at least one hardware processor is further configured to execute the instructions to implement:
calculating, as an image loss, a loss in the image relative to the first sample image;
calculating a combined loss by adding the image loss to the human body loss; and
updating a parameter of the image generation model based on the calculated combined loss.

3. The image processing apparatus according to claim 1, wherein the at least one hardware processor is further configured to execute the instructions to implement:
determining a degree of difference between the first sample image and the image;
calculating, based on the result of the determination and as an authenticity loss, a loss in the image relative to the first sample image
calculating a combined loss by adding the authenticity loss to the human body loss
updating a parameter of the image generation model based on the calculated combined loss.

4. The image processing apparatus according to claim 1, wherein the at least one hardware processor is further configured to execute the instructions to implement:
generating the second sample image from the first sample image; and
setting, a degree of loss of the person in the second sample image that is to be generated.

5. An image processing method comprising
constructing an image generation model for, using image data in which a part of a person is lost as an input image, generating an image in which the lost part of the person has been interpolated, wherein in the constructing, the image generation model is constructed by machine learning in which a first sample image including an image of a person, a second sample image in which a part of the person in the first sample image is lost, and human body information specifying a posture of the person in the first sample image are used;
applying the second sample image to the image generation model and generating an image in which the lost part of the person has been interpolated, wherein
in the constructing:
estimating, from the image generated by the step (b), second human body information specifying a posture of the person in the image;
calculating, as a human body loss, a loss in the second human body information relative to the human body information specifying the posture of the person in the first sample image; and
updating the image generation model based on the calculated loss.

6. The image processing method according to claim 5, wherein
in the constructing, further comprises:
calculating, as an image loss, a loss in the image generated by the step (b) relative to the first sample image, and
calculating a combined loss by adding the image loss to the human body loss, and
in the updating, a parameter of the image generation model is updated based on the calculated combined loss.

7. The image processing method according to claim 5, further comprising
determining a degree of difference between the first sample image and the image generated by the applying, wherein
in the constructing,
based on the result of the determination by the step (c), calculating, as an authenticity loss, a loss in the image generated by the step (b) relative to the first sample image, and
calculating a combined loss by adding the authenticity loss to the human body loss, and in the updating, a parameter of the image generation model is updated based on the calculated combined loss.

8. The image processing method according to claim 5, further comprising
generating the second sample image from the first sample image, and in the generation of the second sample image, setting, based on the result of the calculation by the constructing, a degree of loss of the person in the second sample image that is to be generated.

9. A non-transitory computer readable recording medium that includes a program recorded thereon,
the program including instructions that cause a computer to carry out:
constructing an image generation model for, using image data in which a part of a person is lost as an input image, generating an image in which the lost part of the person has been interpolated, wherein
in the constructing, the image generation model is constructed by machine learning in which a first sample image including an image of a person, a second sample image in which a part of the person in the first sample image is lost, and human body information specifying a posture of the person in the first sample image are used;
applying the second sample image to the image generation model and generating an image in which the lost part of the person has been interpolated, and to further carry out:
in the constructing:
estimating, from the image generated by the step (b), second human body information specifying a posture of the person in the image;
calculating, as a human body loss, a loss in the second human body information relative to the human body information specifying the posture of the person in the first sample image; and
updating the image generation model based on the calculated loss.

10. The non-transitory computer readable recording medium according to claim 9, wherein
the program includes instructions for causing the computer to further carry out, in the constructing,
calculating, as an image loss, a loss in the image generated by the step (b) relative to the first sample image, and
calculating a combined loss by adding the image loss to the human body loss, and
in the updating, a parameter of the image generation model is updated based on the calculated combined loss.

11. The non-transitory computer readable recording medium according claim 9, wherein
the program includes instructions for causing the computer to further carry out:
determining a degree of difference between the first sample image and the image generated by the applying, and to further carry out, in the constructing,
based on the result of the determination by the step (c), calculating, as an authenticity loss, a loss in the image generated by the step (b) relative to the first sample image, and
calculating a combined loss by adding the authenticity loss to the human body loss, and
in the updating, a parameter of the image generation model is updated based on the calculated combined loss.

12. The non-transitory computer readable recording medium according to claim 9, wherein
the program includes instructions for causing the computer to further carry out
generating the second sample image from the first sample image, and in the generation of the second sample image, setting, based on the result of the calculation by the constructing, a degree of loss of the person in the second sample image that is to be generated.

\* \* \* \* \*